US005497179A

United States Patent [19]

Aono et al.

[11] Patent Number: 5,497,179

[45] Date of Patent: Mar. 5, 1996

[54] CHARGE CARRIER MEDIUM AND REPRODUCTION OF ELECTROSTATIC LATENT IMAGE

[75] Inventors: Takashi Aono; Kayoko Sugiyama; Masayuki Iijima, all of Tokyo, Japan

[73] Assignee: Dai Nippon Printing Co., Ltd., Tokyo, Japan

[21] Appl. No.: 969,231

[22] PCT Filed: May 14, 1992

[86] PCT No.: PCT/JP92/00615

§ 371 Date: Mar. 8, 1993

§ 102(e) Date: Mar. 8, 1993

[30] Foreign Application Priority Data

May 15, 1991 [JP] Japan .................................... 3-110447

[51] Int. Cl.[6] .................................................... G01D 15/06

[52] U.S. Cl. ............................................ 347/112; 347/155

[58] Field of Search ........................ 346/153.1; 347/112, 347/153, 155

[56] References Cited

U.S. PATENT DOCUMENTS

| | | | |
|---|---|---|---|
| 4,087,170 | 5/1978 | Sawaoka et al. | 355/3 CH |
| 4,331,753 | 5/1982 | Mikelsons et al. | 430/55 |
| 5,019,835 | 5/1991 | Arahara et al. | 346/1.1 |
| 5,049,935 | 9/1991 | Saito et al. | 346/160 X |
| 5,126,769 | 6/1992 | Lewicki et al. | 346/153.1 |

FOREIGN PATENT DOCUMENTS

| | | |
|---|---|---|
| 63-292153 | 11/1988 | Japan . |
| 64-84242 | 3/1989 | Japan . |

*Primary Examiner*—Peter S. Wong
*Assistant Examiner*—Randy W. Gibson
*Attorney, Agent, or Firm*—Dellett and Walters

[57] ABSTRACT

A charge carrier medium 1 including an insulating layer 11 laminated on an electrically conductive layer 12 with an electrostatic latent image 2 recorded on the insulating layer 11 is brought into contact with water, etc., to resurrect the attenuated potential. Alternatively, the charge carrier medium 1 is previously immersed in water, etc., to deposit onto the surface thereof charges opposite in polarity to those of the electrostatic latent image 2 generated by charging, thereby attenuating the surface potential. This makes any external access to the image information impossible. In reading the image information, a PET film 5 or the like is brought into close contact with the surface of the charge carrier medium 1, and is then peeled apart from that surface to remove the charges of the opposite polarity and thereby resurrect the image information for reading. This makes it possible to protect the image information against a third person's access thereto and provide an assured reproduction of the electrostatic latent image.

11 Claims, 6 Drawing Sheets

CHARGE CARRIER MEDIUM AND REPRODUCTION OF ELECTROSTATIC LATENT IMAGE

BACKGROUND OF THE INVENTION

The present invention relates to a charge carrier medium, and concerns reproducing or reconstructing an electrostatic latent image recorded on the charge carrier medium as well.

BACKGROUND ART

We have already filed Japanese Patent Application No. 63-121592 directed to an invention concerned with a process for recording an image on a charge carrier medium in the form of an electrostatic latent image and reconstructing it, wherein a photosensitive member including on a support an electrically conductive layer and a photoconductive layer is located in proximity and opposition to a charge carrier medium including on a support an electrically conductive layer and an insulating layer. The photosensitive member and charge carrier medium are exposed to light while voltage is applied between the electrically conductive layers thereof, thereby inducing discharge between said photosensitive member and said charge carrier medium. This process makes it possible to obtain analog electrostatic records of high resolution and enables the electrostatic latent image on the charge carrier medium to be kept semipermanently.

The charge carrier medium has the advantages of being able to provide very high resolution recording and keeping image information semipermanently. When it comes into contact with water, etc., however, its apparent potential is so attenuated that it cannot be detected. In addition, the charge carrier medium is still less than perfect in view of security, although providing some difficulty to a third person trying to reconstruct the image information recorded on it.

An object of the present invention is to provide a solution to the problems mentioned above. The charge carrier medium according to the present invention is immersed in water, etc., to deposit thereon charges that are opposite in polarity to those of an electrostatic latent image formed thereon, wherein it remains possible to resurrect the electrostatic latent image which itself cannot be detected in the form of potential. Alternatively, the charge carrier medium is immersed in water, etc., after an electrostatic latent image has been formed thereon, to deposit thereon charges that are opposite in polarity to those of the electrostatic latent image, thus making any external access to the electrostatic latent image impossible. Thus, the present invention enables high-resolution image information to be stored over an extended period of time, makes it possible to resurrect the potential attenuated by contact with water, etc., and protects the image information against third party access so as to improve its security. The present invention provides an electrostatic latent image-reproduction process as well.

DISCLOSURE OF THE INVENTION

More specifically, the present invention provides a charge carrier medium wherein an electrically conductive layer is provided with an insulating layer on which an electrostatic latent image is recorded or wherein a charge carrier medium with an insulating layer having an electrostatic latent image recorded thereon is provided thereon with an insulating coating layer, characterized in that the insulating layer or insulating coating layer is deposited thereon with charges opposite in polarity to those of the electrostatic latent image so as to attenuate the surface potential thereof, and that film is brought in close contact with, and then peeled apart from the surface of the insulating layer or insulating coating layer, onto which charges of the opposite polarity are deposited, so as to remove the charges of the opposite polarity, thereby reconstructing the electrostatic latent image.

The electrostatic latent image recorded on the insulating layer disappears due to charge migration, although it may be externally detected or read in the form of surface potential. Surface potential attenuation also takes place by the deposition of charges of the opposite polarity, because the electric field is so confined that the surface potential cannot be detected.

In one of the former possible mechanisms that induces surface potential attenuation, the electrostatic latent image itself may migrate through the bulk material and leak into the electrically conductive layer. In another mechanism, charges opposite in polarity to the electrostatic latent image may be injected from the electrically conductive layer to the electrostatic latent image, resulting in its neutralization. In a further possible mechanism, the electrostatic latent image may not be detected due to the polarization of the bulk material. In still a further possible mechanism, surface conduction may cause charge diffusion.

In one of the later possible mechanisms, charges opposite in polarity to the electrostatic latent image may be deposited onto it by being immersed in water, etc. In another possible mechanism, atmospheric charges opposite in polarity to the electrostatic latent image may be selectively deposited onto it.

Upon receiving charges that are opposite in polarity to those of the electrostatic latent image, the electrostatic latent image itself disappears, provided that it is neutralized or re-combined with them. Although depending on the types of charge carrier media selected, however, some electrostatic latent images do not disappear and so remain, if not detected in the form of surface potential.

So far, such electrostatic latent images, if not detected in the form of surface potential, have been regarded as disappearing. In the present invention, however, it is possible to erase another subsequently resurrect the apparently excised electrostatic latent image by bringing film in close contact with the electrostatic latent image, and then subsequently peeling the film away from the electrostatic latent image.

Consequently, it has now been found that it is possible to resurrect an electrostatic latent image, that disappears apparently by contact with water, etc., or has its surface potential attenuated by the deposition of external charges opposite in polarity thereto during storage.

On the contrary, it is possible to increase the security of electrostatic latent images recorded on a charge carrier medium as by immersing it in water for the deposition of charges opposite in polarity to it, thereby rendering it substantially impossible to externally detect those latent images and, hence, impossible for a third person to reconstruct them.

For the film capable of resurrecting the charges of opposite polarity, use may be made of an electrically conductive or insulating film. However, it is desired to select a film combination that does not induce electrification, when it is brought into close contact with, and then peeled away from, a charge carrier medium, with no electrostatic latent image being formed on it—a phenomenon generally called electrification-by-peeling. In order to resurrect the electrostatic latent image faithfully, it is desired to improve the adhesion of the film to the charge carrier medium with the application of a load or the insertion of a cushioning material under a load.

For instance, an insulating film such as a PET film may be directly used. In this case, however, it is preferable to provide an electrically conductive layer like an Al layer on the side of the charge carrier medium which is brought in close contact with the PET film, thereby enhancing the adhesion of the PET film to the charge carrier medium. This is because charges opposite in polarity to the charges deposited onto the charge carrier medium are induced on the electrically conductive layer, producing electrostatic attraction that makes some contribution to such adhesion improvement.

BEST MODE FOR CARRYING OUT THE INVENTION

Figure 1A:
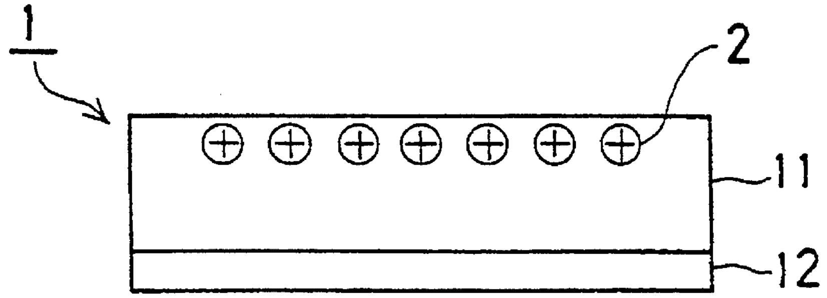
FIGS. 1(*a*)–1(*c*) illustrate one embodiment of the invention.
Figure 1B:
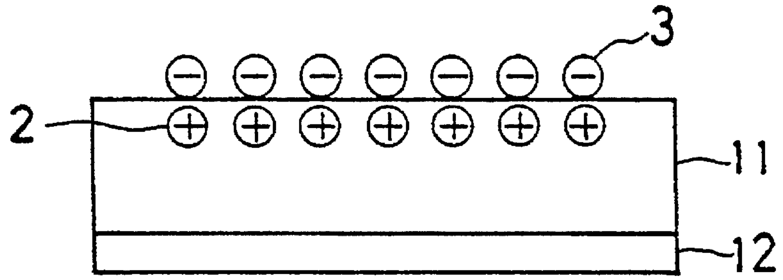
Figure 1C:
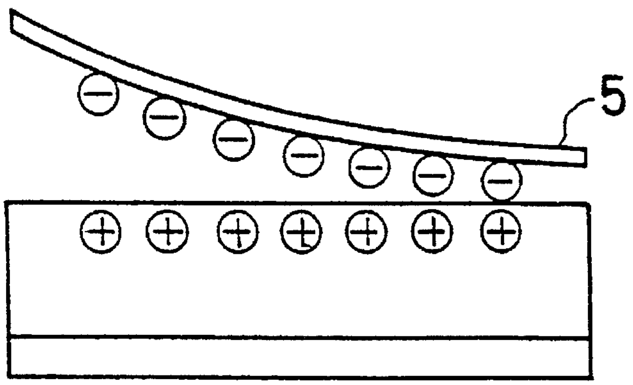

FIGS. 1(*a*)–1(*c*) represent one embodiment of the invention. In FIGS. 1(*a*)–1(*c*), reference numeral 1 denotes a charge carrier medium, 11 an insulating layer, 12 an electrically conductive layer, 2 an electrostatic latent image, 3 charges opposite in polarity to 2, and 5 a PET film.

The charge carrier medium 1 is constructed by the lamination of the insulator 11 of fluoropolymer (commercially available under the trade name of Cytop) on the electrically conductive layer 12 at a thickness of about 2.6 μm. Of course, the charge carrier medium 1 may be laminated on a glass substrate, although not shown. A photosensitive member that can be either corona-charged or photoconductive to a charge carrier medium is located in opposition to such a charge carrier medium 1, and the so-called exposure with the application of voltage is accomplished, wherein image exposure is done while voltage is applied between the electrically conductive layers of both the members to record the electrostatic latent image 2, as illustrated in FIG. 1(*a*). For the purpose of convenience, the charges are illustrated in the insulating layer. It is noted, however, that these charges, if not evidently clarified, are most likely to be present on, or in the vicinity of, the surface of the insulating layer. Then, the charge carrier medium 1 with the electrostatic latent image recorded thereon is wetted on the insulating layer's surface as by water, or otherwise placed in a high-humidity atmosphere, whereby charges contrary in polarity to the latent image are deposited onto the surface of the insulating layer 11, as illustrated in FIG. 1(*b*). The thus deposited charges 3 of the contrary polarity set off the potential due to the electrostatic latent image, so that no surface potential can be externally detected, preventing external reading of the electrostatic latent image. As shown in FIG. 1(*c*), the PET film 5 aluminized on one side to a thickness of about 12 μm is placed with the other side on the charge carrier medium, and then brought into close contact with the charge carrier medium by the application of pressure or friction. After this, the film is peeled away from the charge carrier medium, whereby the charges 3 of the opposite polarity as were previously deposited on the insulating layer 11 can be removed by the PET film 5. In this case, the charges that form the electrostatic latent image 2 are trapped in the insulating layer 11, so that the electrostatic latent image 2 can be read after removal of the charges of the opposite polarity by the PET film.

Figure 2A:
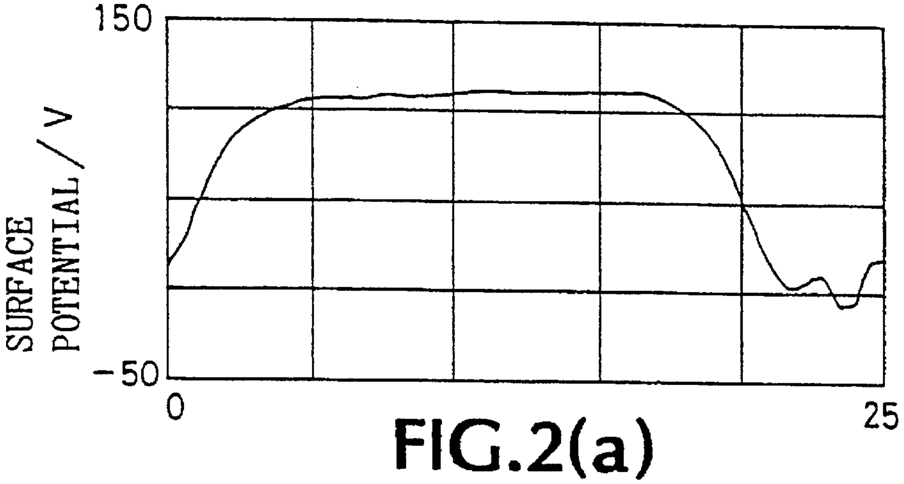
FIGS. 2(*a*)–2(*c*) are graphical illustrations of the surface potentials in some sections through the charge carrier medium according to the invention, FIGS. 3(*a*)–3(*c*) comprise graphical illustrations of one example of the invention that is of negative surface potential, FIGS. 4(*a*)–4(*c*) illustrate another embodiment of the invention that includes a coating layer, FIGS. 5(*a*)–5(*c*) comprise graphical illustrations of the surface potentials in some sections through the charge carrier medium according to the invention.
Figure 2B:
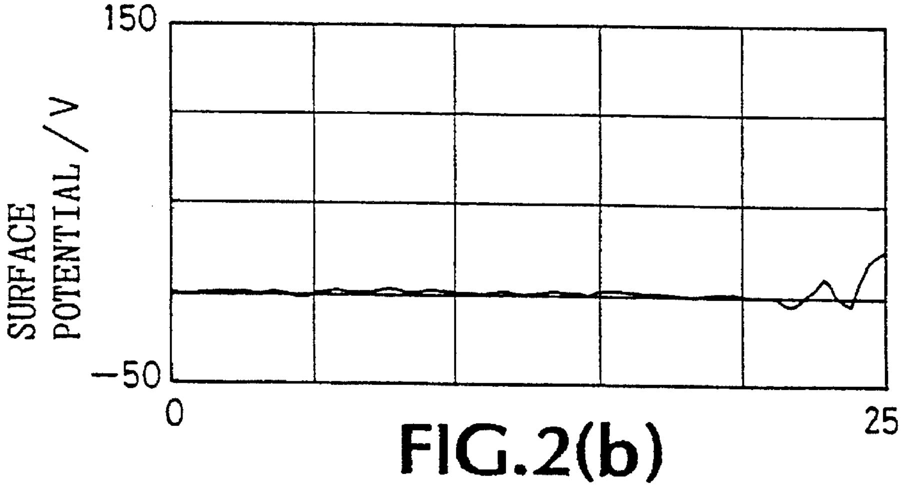
Figure 2C:
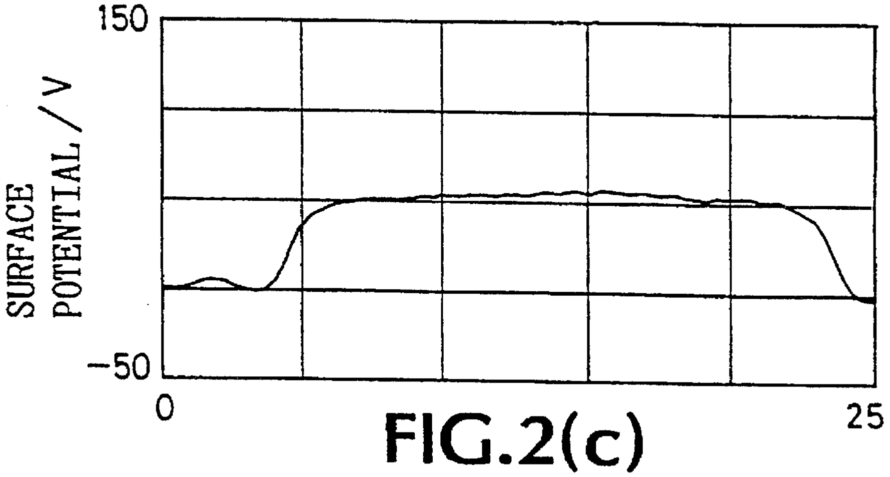

FIGS. 2(*a*)–2(*c*) graphically illustrate the surface potentials in some sections through the charge carrier medium shown in FIGS. 1(*a*)–1(*c*), with position (mm) as abscissa and surface potential (V) as ordinate. As shown in FIG. 2(*a*), the charge carrier medium is charged to about 110 V as by corona charging or exposure to light with the application of voltage. Subsequent immersion of the charge carrier medium in water, etc., causes its surface potential to drop to almost zero V, as shown in FIG. 2(*b*). In this state, a third person cannot recognize that the electrostatic latent image is recorded on the charge carrier medium; in other words, nobody can read it without permission. Then, a PET film of approximately 12 μm in thickness is placed on the charge carrier medium, as mentioned above, and brought in close contact therewith under a pressure of 100 $kgf/cm^2$. Subsequent peeling of the PET film permits the charge carrier medium to have a surface potential of approximately 50 V, as shown in FIG. 2(*c*). This surface potential, although about half the original surface potential, enables the electrostatic latent image to be reconstructed.

Figure 3A:
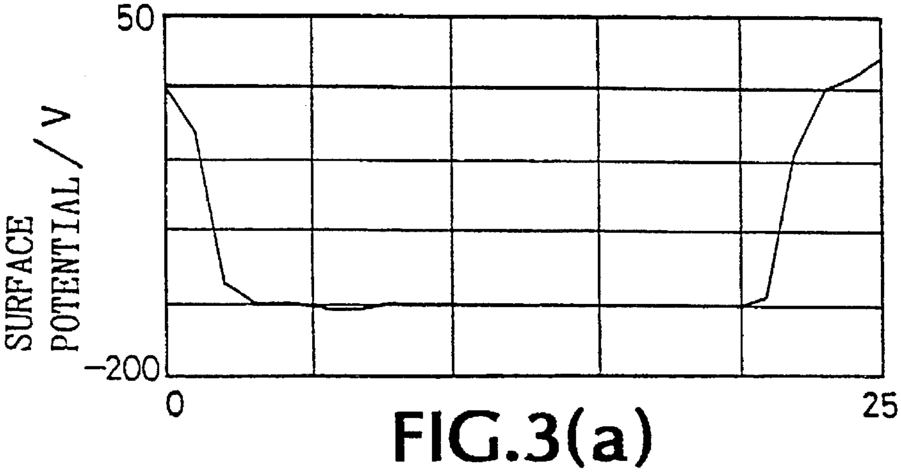
Figure 3B:
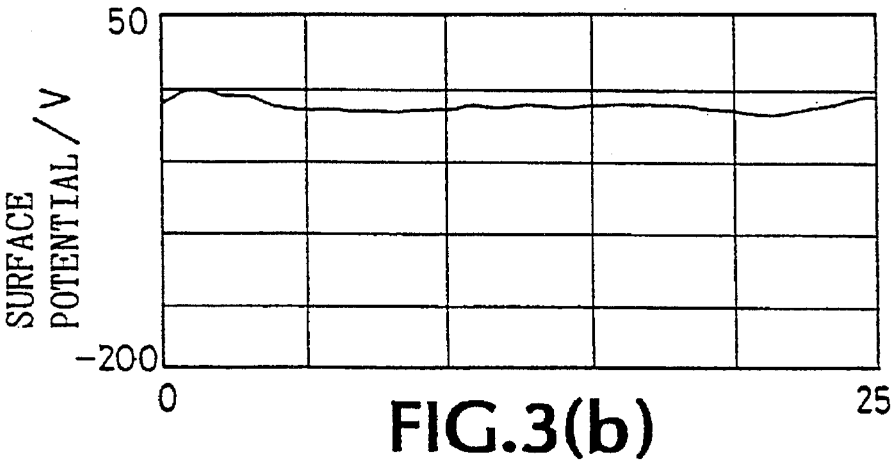
Figure 3C:
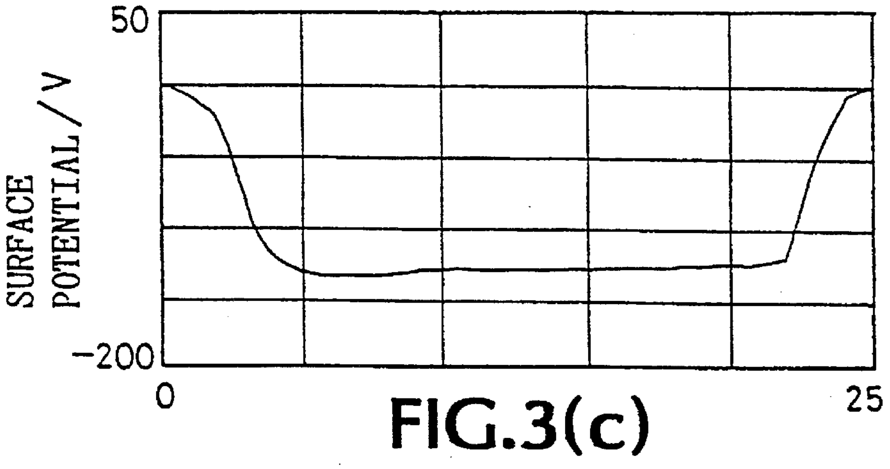

Referring to FIGS. 3(*a*)–3(*c*), the charge carrier medium is charged to an initial potential of approximately −150 V under similar conditions as mentioned in connection with FIGS. 2(*a*)–2(*c*).

In this case, the image potential can be resurrected to about 90%, so that the electrostatic latent image can be reconstructed faithfully.

Figure 4A:
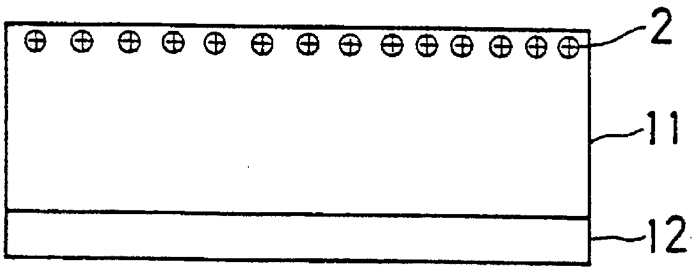
Figure 4B:
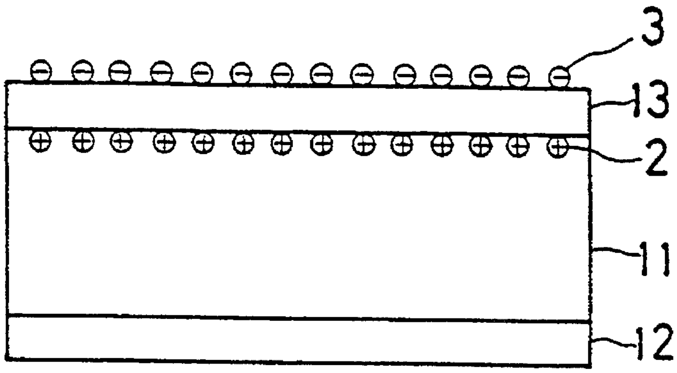
Figure 4C:
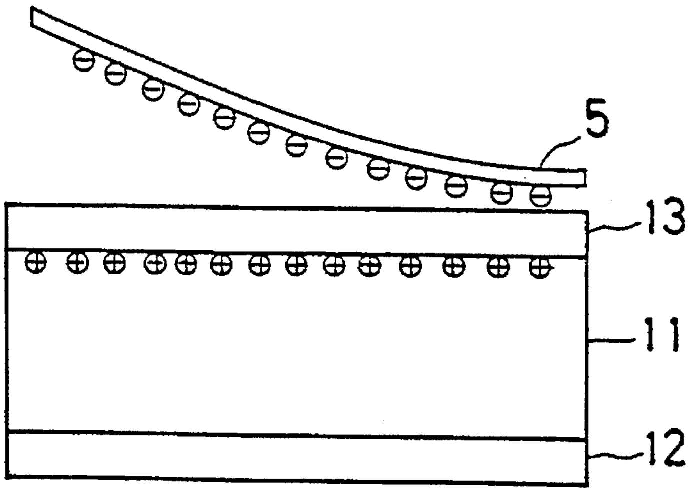

Another embodiment of the invention is illustrated in FIGS. 4(*a*)–4(*c*) wherein the same reference numerals as in FIGS. 1(*a*)–1(*c*) denote the same parts. It is noted, however, that reference numeral 13 stands for a coating layer.

In the instant embodiment, an additional coating layer 13 is formed on the charge carrier medium shown in FIG. 1(*a*). To be more specific, the electrostatic latent image 2 is formed on the insulating layer, as shown in FIG. 4(*a*), and the insulating coating layer 13 is then laminated on the insulating layer 11. The charge carrier medium is then immersed in water, etc., to deposit the charges 3 of the opposite polarity onto the insulating coating layer 13, thereby setting off the surface potential. As in the first embodiment and as shown in FIG. 4(*c*), the PET film 5 is closely engaged onto the charge carrier medium. Subsequent peeling of the film 5 gives rise to the resurrection of the electrostatic latent image, which can in turn be read through the insulating coating layer.

In one experiment using the charge carrier medium shown in FIGS. 1(*a*)–1(*c*), a Cr mask with a resolution pattern formed on it was located in opposition to the charge carrier medium with a space of about 10 μm between them. Then, a given voltage was impressed on the electrically conductive layer of the charge carrier medium and the Cr portion of the Cr mask with Cr as (−) and the conductive layer (+), for generating a negatively charged electrostatic latent image. Observation of this medium under an electron microscope indicated that the electrostatic latent image was formed with a resolution of 6.6 μm. After the electrostatic latent image had been erased by immersing the charge carrier medium in water, it was resurrected under similar conditions. Observation of the resurrected latent image under an electron microscope indicated that it had a resolution of 6.6 μm.

Figure 5A:
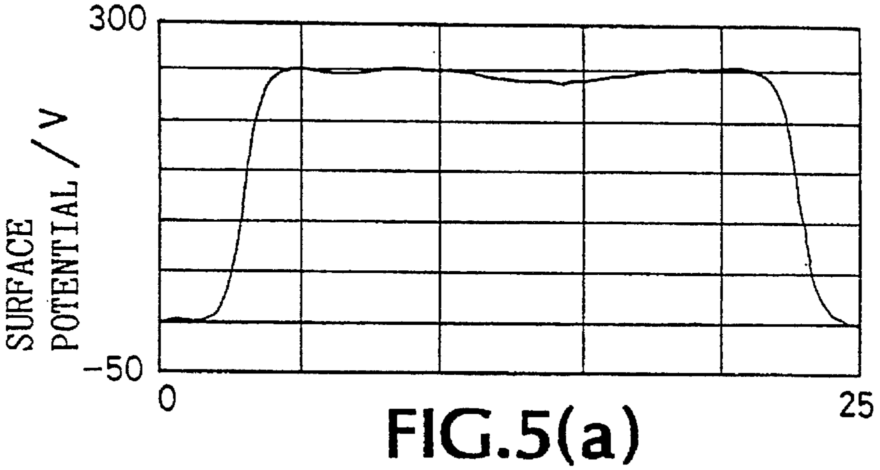
Figure 5B:
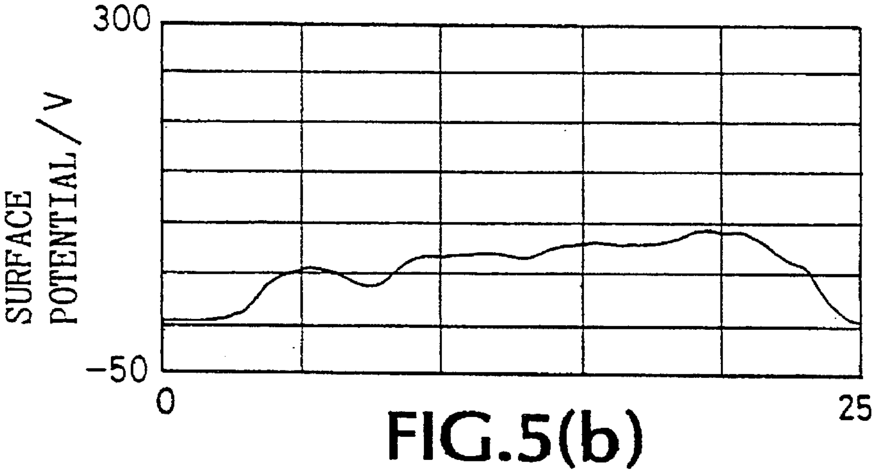
Figure 5C:
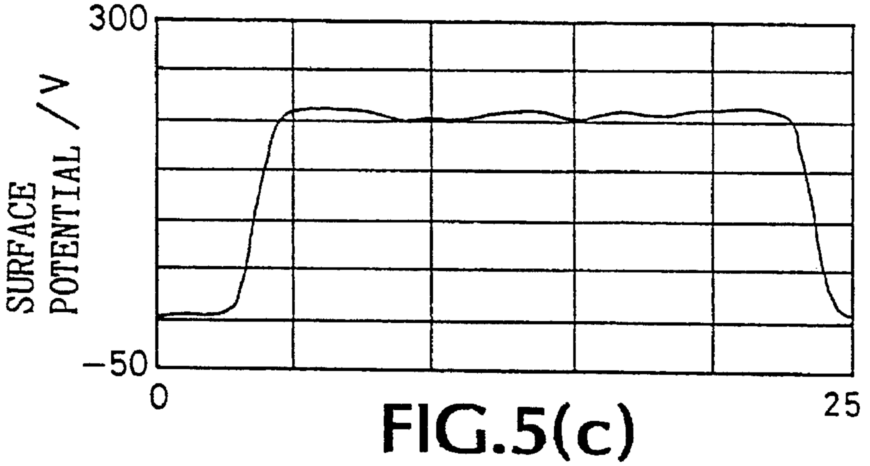

FIGS. 5(*a*)–5(*c*) graphically illustrate the surface potentials in some sections through the charge carrier medium shown in FIGS. 4(*a*)–4(*c*). The charge carrier medium is first charged to approximately 250 V and then immersed in water, etc., to deposit charges of the opposite polarity thereon, so that the surface potential attenuates to about 50–100 V. Subsequent close engagement and disengagement of film with and from the charge carrier medium causes the surface potential to come back to approximately 200 V. In the instant embodiment, it is noted that the surface potential cannot perfectly be reduced to zero, as shown in FIG. 5(*b*). However, since the surface potential distribution differs from the initial one, nobody can read the initial image information.

Figure 6:
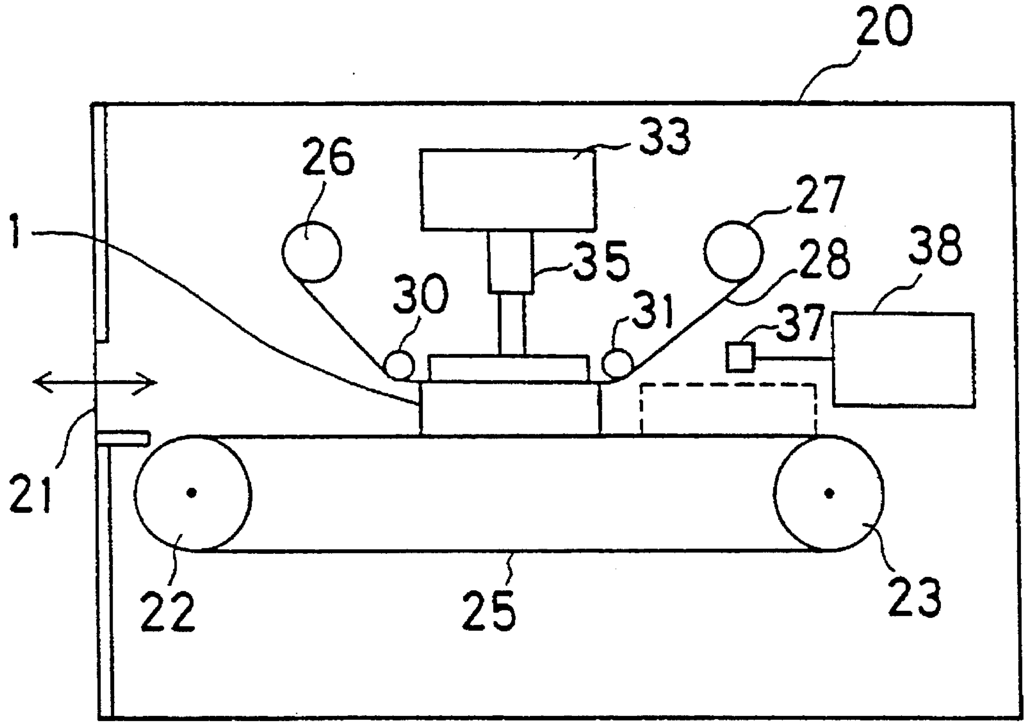
FIG. 6 represents one embodiment of the reader for reading an electrostatic latent image on the charge carrier medium of the invention.

FIG. 6 is a view showing one embodiment of the reader for reading the electrostatic latent image on the charge carrier medium according to the present invention.

The reader 20 includes rollers 22 and 23 that enable an endless belt 25 to rotate in opposite directions and a window 21 through which the charge carrier medium 1 is loaded to carry it on the belt 25. On the other hand, a feed reel 26 and a take-up reel 27 operate to feed a PET film 28 which, at a predetermined position, is closely engaged onto the charge carrier medium 1 by a piston 35 driven by a driving unit 33. In this state, the belt 25 is further moved to peel apart the PET film 28 from the charge carrier medium, whereby the charges of the opposite polarity are removed from the charge carrier medium, so that the electrostatic latent image can come out for reading by a reading unit 37. The thus read electrostatic latent image information is processed by a signal processor 38. The charge carrier medium, once the electrostatic latent image has been read therefrom, is removed out of the window 21 by moving the belt in the opposite direction. In removing the charge carrier medium out of the window 21, it is noted that charges of the opposite polarity may be again deposited onto it. Alternatively, the charges may be erased off as by heating for re-use.

INDUSTRIAL APPLICABILITY

As explained above, the electrostatic latent image recorded on the charge carrier medium is set off by charges opposite in polarity thereto, so that its security can be improved to such an extent that nobody can read the latent image. The charges of the opposite polarity deposited thereon are subsequently removed by film engagement and disengagement to resurrect the electrostatic latent image. Thus, enhanced security and long-term storage of electrostatic information are made possible. Thus, the invention finds wide application in the art.

What we claim is:

1. A charge carrier medium for carrying information, said charge carrier medium including an insulating layer laminated on an electrically conductive layer with an electrostatic latent image representative of said information recorded on the insulating layer, characterized in that charges opposite in polarity to said electrostatic latent image are provided to the surface of said insulating layer and collected thereon in accordance with said electrostatic latent image, thereby attenuating a surface potential pattern of said electrostatic latent image on the insulating layer and rendering said electrostatic latent image substantially undetectable and invisible.

2. A charge carrier medium for carrying information, said charge carrier medium including an insulating layer laminated on an electrically conductive layer with an electrostatic latent image recorded on the insulating layer, characterized in that an additional insulating coating layer is laminated on the insulating layer with the electrostatic latent image recorded thereon, charges opposite in polarity to said electrostatic latent image being provided to said coating layer and collected thereon in accordance with said electrostatic latent image, thereby attenuating a surface potential pattern as provided by said electrostatic latent image of the insulating layer and rendering said electrostatic latent image substantially undetectable and invisible.

3. A charge carrier medium as claimed in claim 1 or 2, characterized by being made up of fluoropolymer.

4. A process for reproducing an electrostatic latent image on a charge carrier medium, the charge carrier medium including an insulating layer laminated on an electrically conductive layer with an electrostatic latent image recorded on the insulating layer, characterized in that charges opposite in polarity to said electrostatic latent image are deposited onto the surface of said insulating layer, thereby attenuating a surface potential pattern of said electrostatic latent image and rendering said electrostatic latent image substantially undetectable and invisible, the process being characterized by bringing film into close contact with the surface of the insulating layer onto which charges opposite in polarity to said electrostatic latent image are deposited and then peeling said film off said surface to remove said charges opposite in polarity and thereby restore said electrostatic latent image.

5. An image reproduction process as claimed in claim 4, characterized in that said film is a PET film.

6. An image reproduction process as claimed in claim 4, characterized in that the close contact of said film onto said charge carrier medium is carried out by applying pressure or friction therebetween.

7. A process for reproducing an electrostatic latent image recorded on a charge carrier medium, the charge carrier medium including an insulating layer laminated on an electrically conductive layer with an electrostatic latent image recorded on the insulating layer, characterized in that an additional insulating coating layer is laminated on the insulating layer with the electrostatic latent image recorded on said additional insulating coating layer, charges opposite in polarity to said electrostatic latent image being deposited onto said coating layer, thereby attenuating a surface potential pattern of said electrostatic latent image and rendering said electrostatic latent image substantially undetectable and invisible, the process being characterized by bringing film into close contact with the surface of the coating layer onto which charges opposite in polarity to said electrostatic latent image are deposited and then peeling said film off said surface to remove said charges opposite in polarity and thereby restore said electrostatic latent image.

8. An image reproduction process as claimed in claim 7, characterized in that said film is a PET film.

9. An image reproduction process as claimed in claim 5, characterized in that the close contact of said film onto said charge carrier medium is carried out by applying pressure or friction therebetween.

10. An image reproduction process as claimed in claim 7, characterized in that the close contact of said film onto said charge carrier medium is carried out by applying pressure or friction therebetween.

11. An image reproduction process as claimed in claim 8, characterized in that the close contact of said film onto said charge carrier medium is carried out by applying pressure or friction therebetween.

* * * * *